United States Patent [19]

Kaplan et al.

[11] Patent Number: 4,853,004
[45] Date of Patent: Aug. 1, 1989

[54] METHOD FOR DENSELY PACKING MOLECULAR SIEVE ADSORBENT BEDS IN A PSA SYSTEM

[75] Inventors: Robert H. Kaplan, New City, N.Y.; Alberto LaCava, South Plainfield, N.J.; Arthur I. Shirley, New Providence, N.J.; Steven M. Ringo, Springtown, N.J.

[73] Assignee: The BOC Group, Inc., Murray Hill, N.J.

[21] Appl. No.: 146,017

[22] Filed: Jan. 20, 1988

[51] Int. Cl.$^4$ .............................................. B01D 53/04
[52] U.S. Cl. .......................................... 55/25; 55/75; 55/389
[58] Field of Search .................... 55/25, 26, 68, 74, 75, 55/387, 389, 518, 519; 210/503

[56] References Cited

U.S. PATENT DOCUMENTS 4,283,204  8/1981  Savage ................................ 55/75 X
4,312,641  1/1982  Verrando et al. ................... 55/75 X
4,344,775  8/1982  Klein ..................................... 55/75

FOREIGN PATENT DOCUMENTS 2504361  11/1975  Fed. Rep. of Germany ........ 55/389

Primary Examiner—Robert Spitzer
Attorney, Agent, or Firm—Carol A. Nemetz; R. Hain Swope; L. R. Cassett

[57] ABSTRACT

The improvement in the separation of a gaseous mixtures by pressure swing adsorption (PSA) is disclosed. The interparticle voids in conventional PSA adsorbent beds are filled with fine particles. The ratio of the smallest dimension of the coarse adsorbent particles to the largest dimension of the fine particles, the size of the fine particles themselves and the present of volume of the fine particles in the bed are all critical to optimum PSA performance. The fine particles may be comminuted adsorbent or an inert material, i.e. one having no adsorptive capacity.

6 Claims, 2 Drawing Sheets

METHOD FOR DENSELY PACKING MOLECULAR SIEVE ADSORBENT BEDS IN A PSA SYSTEM

This invention relates to gas enrichment utilizing pressure swing adsorption techniques, and more particularly to an improved pressure swing adsorption process wherein the efficiency of the absorbent bed is improved by packing with molecular sieve particles and fines.

BACKGROUND OF THE INVENTION

The use of adsorption techniques to separate a gaseous component from a gaseous stream was initially developed for the removal of carbon dioxide and water from air. Gas adsorption techniques are now conventionally employed in processes for the enrichment of hydrogen, helium, argon, carbon monoxide, carbon dioxide, nitrous oxide, oxygen and nitrogen. Gas enrichment utilizing at least two adsorption vessels in a cycling pressurized relationship is commonly referred to as pressure swing adsorption (PSA).

A typical PSA process for enriching a gas, for example nitrogen from air, employs at least two adsorption beds filled with molecular sieve material, each being subjected to two or more, generally four, distinct processing steps in each cycle. In a first step of the cycle, one adsorption bed is pressurized with concomitant nitrogen production while the other bed is regenerated, such as by venting. In a second step, often referred to as pressure equalization, the adsorption beds are placed in fluid communication, thereby being brought to an intermediate pressure. In a third step, the first adsorption bed is regenerated, sometimes with a countercurrent flow of product-quality gas to enhance the regeneration (referred to as "purge"), while the second bed is pressurized with concomitant nitrogen product. The last step of the cycle is pressure equalization between the beds. During such pressure swings, pressure conditions in the adsorption beds typically vary from about 15 psig to 120 psig in a process employing carbon molecular sieves for nitrogen production and somewhat lower pressure ranges in processes employing crystalline zeolites for producing oxygen.

Although pressure swing adsorption (PSA) techniques have been refined to some degree, PSA still suffer certain disadvantages inherent in being a cyclic process. For example, in the process of removing a strongly adsorbed component from a weakly adsorbed product component of a gaseous mixture, the purge step of the PSA cycle serves the desirable function of removing the strongly adsorbed component from the sieve, but is also accompanied by an undesirable loss of the product component which is contained in the interparticle voids of the bed. The interparticle voidage of a typical adsorbent bed is about forty percent of the total bed volume, and losses from this source can therefore be significant.

The problem is substantially alleviated in accordance with the present invention which provides major reductions in bed voidage by combining with the molecular sieve particles certain percentages of fine material of a particular particle size range to achieve an optimum volume ratio of comparatively coarse sieve material and fine particles in the bed. A very significant enhancement in yield can be achieved by using these beds in PSA processes, such as nitrogen enrichment.

It is known to combine in a vessel coarse and fine particles intended for adsorption of a material. Ma, U.S. Pat. No. 3,757,490, discloses such a particle mix in a system intended for solid-liquid chromatographic separations. The particles utilized by Ma are all active adsorbent particles and are relatively close in size range in that ninety percent by weight have a diameter within ten percent of the average diameter of all particles. Ma is also concerned only with a solid-liquid system which is markedly different from a PSA gas separation system.

More recently, Greenbank in European Pat. No. 0 218 403 discloses a dense gas pack of coarse and fine adsorbent particles wherein the largest fine particles are less than one-third of the coarse particles and sixty percent of all particles are larger than sixty mesh. Although not specifically stated, it is evident from the examples that these percentages are by volume. This system is designed primarily for enhancing gas volume to be stored in a storage cylinder. It is mentioned, however, that it can be utilized for molecular sieves. There is nothing in this application which would give insight into the fact that, in order to obtain significantly enhanced PSA efficiency, the size range of both the coarse and fine particles, the size ratio between them and the volume ratio between them in the bed are all critical parameters in obtaining optimum gas separation. Such critical parameters are provided in accordance with the present invention.

SUMMARY OF THE INVENTION

There is provided a means of significantly enhancing the performance of a pressure swing adsorption system by packing the adsorbent beds thereof with from about ten to fifty percent by volume of fine particles and from about fifty to ninety percent by volume of coarse particles wherein the ratio of the smallest dimension of the coarse particles, or pellets, to the largest dimension of the fine particles is from about five to about fifteen to one and the fine particles are in the range of forty to sixty mesh.

DETAILED DESCRIPTION OF THE INVENTION

The present invention is directed to a PSA system wherein the adsorbent beds contain a particular mixture of coarse adsorbent material, i.e. molecular sieve, and fine particles. The size relationship between the coarse adsorbent particles, or pellets, and the fines, as well as the ratio of percent by volume of each type of material, are critical parameters in improving PSA efficiency. Fine particles as contemplated herein includes both comminuted adsorbent material and inactive material, i.e. material which has no capacity for gas separation. Examples of suitable inactive materials include glass beads, particles of certain plastics and the like with glass beads being preferred.

Pressure swing adsorption (PSA) is a known process which can be advantageously employed to selectively adsorb various components of readily available feed gas mixtures, thereby separating and purifying a desired product gas. For example, PSA can be advantageously used to separate nitrogen from air. Other applications of PSA include the separation and purification of hydrogen present as a major component of a feed gas mixture also containing carbon dioxide as a selectively adsorbable component, commonly together with one or more additional minor components to be removed as undesired impurities, such as nitrogen, argon, carbon monoxide, and the like.

The PSA process, in general, can be carried out using any suitable adsorbent material having a selectively for one or more components of a gaseous mixture. Suitable adsorbents include zeolite molecular sieves and activated carbon. Zeolite molecular sieve adsorbents are generally preferable for the separation and purification of hydrogen contained in mixtures with carbon dioxide and the like. The preferred material utilized to separate nitrogen from air is an activated carbon having pores which have been modified so that oxygen molecules are selectively adsorbed from nitrogen molecules commonly known as carbon molecular sieve (CMS). A preferred CMS material is prepared according to the process described in U.S. Pat. No. 4,458,022.

Figure 1:
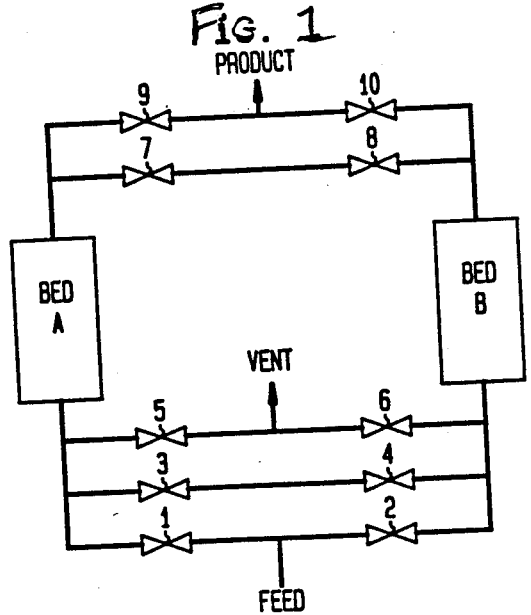
FIG. 1 is a schematic diagram of a conventional PSA system comprising two adsorbent beds.

A basic two-bed PSA process is shown schematically in FIG. 1. In FIG. 1, the valves controlling flow of feed into the system, product withdraw and waste gas venting from adsorbent beds A and B are numbered 1 through 10. A full cycle on a conventional PSA unit as shown in FIG. 1 is as follows:

| Step | Bed A | Bed B |
| --- | --- | --- |
| 1 | Bed Pressure equilization | |
| 2 | Pressurization and Product release | Vent to Atmospheric Pressure |
| 3 | Constant feed and Product release | Vent to Atmospheric Pressure |
| 4 | Bed Pressure equilization | |
| 5 | Vent to atmospheric pressure | Pressurization and product release |
| 6 | Vent to atmospheric pressure | Constant feed and product release |

Figure 2:
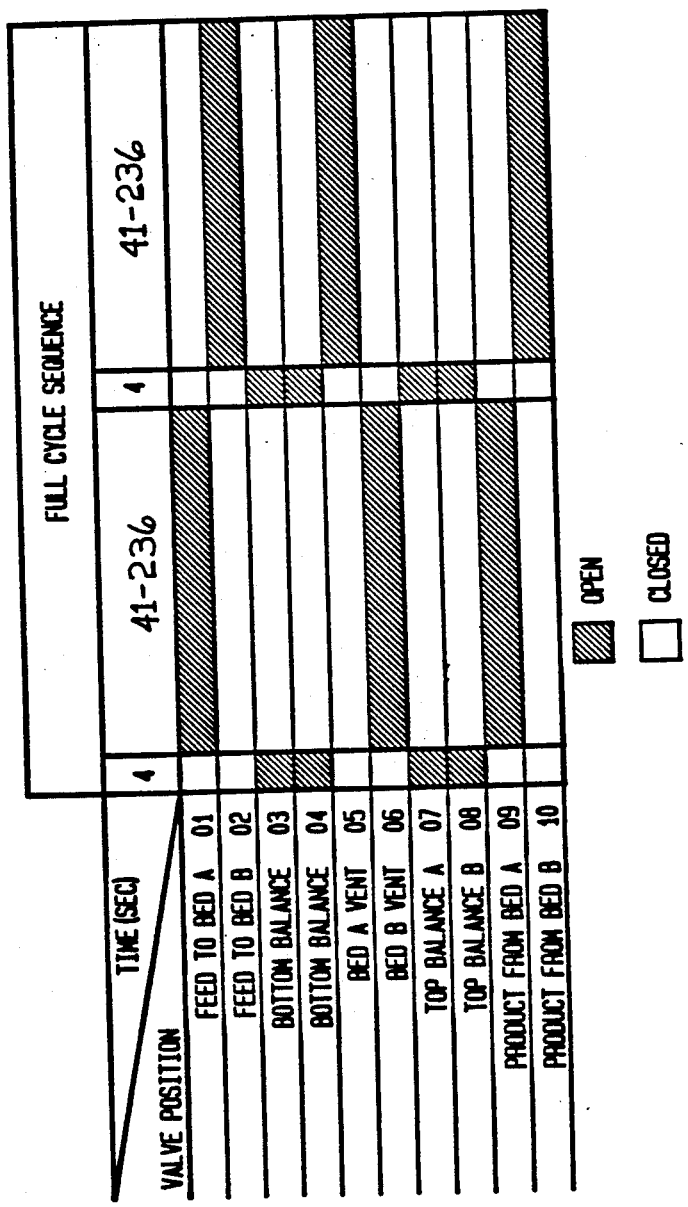
FIG. 2 is a chart of the sequence of steps in the PSA cycle using the PSA system shown in FIG. 1.

Typical timing and valve positions are shown in FIG. 2 using a cycle time of 120 seconds and 100 psig product pressure.

In conventional PSA processes, the adsorbent columns are packed with adsorbent material, e.g. carbon molecular sieve (CMS), in pellet or bead form. The pellet form of CMS as is commercially available can have an average diameter of from 1 to 7 mm, preferably 2.5 to 3 mm. The packing of a bed with such CMS material results in a certain amount of void volume which is the space between the pellets or beads where no material will fit. The gas that fills the void volume does not interact with the sieve material and, therefore, adversely affects the efficiency of the unit in several ways. The impure gas in the void space will combine with product gas thereby reducing productivity. Interstitial gas in the void spaces must be vented during regeneration thereby producing an increased amount of vent gas and, if a purge step is utilized, requiring a greater quantity of purge gas to clean the bed. If the purge gas is product quality, this represents an additional loss in efficiency.

It has been found in accordance with this invention that the aforementioned problems can be overcome by packing the beds with a mixture of coarse and fine particles, thereby filling the interstitial void volume. It has further been found that the ratio by volume of the coarse to fine particles as well as their size ratio are both critical to achieving optimum PSA efficiency. Further, these parameters apply regardless of whether or not the fine material possesses adsorbent capacity.

It will be appreciated by those skilled in the art that the fine particles utilized to pack an adsorbent bed for a PSA unit must be reduced to below a certain maximum particle size in order to obtain efficient packing of the interstitial spaces in a bed filled with conventional coarse particles. What is not readily appreciated, however, is that there is also a minimum particle size for the fine particles below which efficiency of the PSA unit actually decreases.

In a PSA unit wherein the fine particles in the adsorbent bed are too small, fluidization of the particles within the bed will take place due to the large pressure changes. The fluidized fines exert a grinding action which reduces the size and effectiveness of the coarse particles and reduces the fines themselves to dust. Those skilled in the art recognize that dust is very undesirable in a PSA operation both as a product contaminant and because of detrimental effects, e.g. plugging, on valves, analytical instrumentation and the like.

We have found that specific ranges for particle size for the fines, the size ratio of the fines to the coarse particles, and the percent by volume ratio of the fines to the coarse particles in the bed, are all essential to the optimum performance of the PSA unit. Further, these considerations hold true regardless of whether the fines are ground active material or inert material having no capacity to separate mixtures of gases by preferential adsorption.

As previously stated, there are disadvantages in utilizing fine particles of too small as well as too large dimension. When utilizing commercially available CMS pellets having a diameter of 2.5 to 3 millimeters, for example, the fines should have a particle size of −40/+60 U.S. Standard Mesh, i.e. all particles will pass a U.S. Standard Mesh 40 sieve and be retained on a U.S. Standard 60 Mesh sieve. This is equivalent to a particle size of from about 250 to 375 microns. It will be appreciated by those skilled in the art that these dimensions are exemplary and represent an optimum range for the diameter of the coarse particles.

The relative size ratio of the coarse to fine particles is likewise critical in achieving optimum PSA performance. We have found that the ratio of the smallest dimension of the coarse particles, typically the diameter of commercial CMS pellets, to the largest dimension of the fine particles should be between about 5:1 and 15:1, preferably between about 6.6:1 and 12:1. While these ratios are generally applicable, those skilled in the art will appreciate that there are practical size limitations of commercially available CMS or other adsorbents and that these, in turn, dictate the size limitations of the fine particles to be combined therewith.

The final criterion to be considered in achieving an adsorbent bed packing for optimum PSA performance is the volume ratio of fine to coarse particles in the bed. It will be appreciated that the volume ratio and weight ratio will be approximately the same when the fine particles are comminuted coarse adsorbent material. However, there could be a discrepancy utilizing inert fines which have a density materially different from that of the coarse particles. Hence, it is preferred to express the percentage fill in terms of volume. It has been found that the percent by volume of fine particles in the bed should be from about 10 to 50, preferably from about 38 to 42, and most preferably about forty.

The improved results in both specific product and product yield are obtainable in accordance with this invention utilizing either finely comminuted adsorbent or inert material. The latter is preferable for many applications for two reasons, i.e. the cost of obtaining fine particles of the desired size commercially may be less than the cost of the equipment and energy required to grind commercial adsorbent particles to the desired size range and the fact that commercial particles are typically more uniform in size and shape than comminuted adsorbent particles. An additional factor in the cost of utilizing finely ground commercial adsorbent is undersize particles and dust which are potentially hazardous and which must be adequately disposed of. The advantage of utilizing comminuted adsorbent particles over inert particles is the fact that the former have gas separation capacity so that the drop in efficiency is not as great when the gradual addition of fine particles no longer is filling the voids but has begun to displace the coarse particles. Clearly, such conditions are to be avoided or, at best, minimized.

The following Examples further illustrate this invention, it being understood that the invention is in no way intended to be limited to the details described therein. In the Examples, all parts and percentages are on a volume basis and all temperatures are in degrees Celsius, unless otherwise stated.

EXAMPLE 1

A series of experimental runs was conducted utilizing a conventional PSA unit as illustrated in FIG. 1, and a range of cycle times of from 90 to 480 seconds according to the flow diagram as shown in FIG. 2. The adsorbent beds contained approximately 2 liters of commercial 2.5 mm CMS, Kuraray Chemical Company, density 0.664 g/ml.

A second series of runs was conducted under the same conditions utilizing a bed packing of about sixty percent of the commercial CMS material and about forty percent of communited CMS material having a particle size range of −40/+60 mesh, i.e. all particles will pass a 40 mesh U.S. Standard sieve and be retained on a 60 mesh U.S. Standard sieve, density, 0.749 g/ml. The ratio of smallest dimension of the CMS material to the largest diameter of the communited fines was about 10:1. At steady state, product purity was ninety-nine percent. The results are given in Table I. All runs were at 100 psig pressure.

TABLE I

| Cycle Time Seconds | Spec. Prod. Liter/Hr. | Mass Sp. Prod. m³/Tonne/Hr. | Yield Percent |
|---|---|---|---|
| Commercial CMS | | | |
| 480 | 45.76 | 68.92 | 55.45 |
| 480 | 48.27 | 72.69 | 57.14 |
| 360 | 57.90 | 87.20 | 55.59 |
| 360 | 58.31 | 87.82 | 53.53 |
| 180 | 74.79 | 112.64 | 50.53 |
| 180 | 75.25 | 113.33 | 52.08 |
| 120 | 82.23 | 124.74 | 47.43 |
| 120 | 83.41 | 125.62 | 46.30 |
| 90 | 85.96 | 129.46 | 41.86 |
| 60% Commercial CMS/40% Fines (−40, +60 Mesh) | | | |
| 480 | 49.52 | 66.11 | 57.84 |
| 480 | 50.50 | 67.43 | 62.43 |
| 360 | 66.60 | 88.92 | 56.72 |
| 360 | 69.14 | 92.31 | 54.94 |
| 360 | 70.07 | 93.55 | 55.81 |
| 180 | 82.22 | 109.77 | 42.24 |
| 180 | 90.00 | 120.16 | 53.96 |
| 180 | 95.19 | 127.09 | 53.89 |
| 180 | 99.23 | 132.48 | 55.39 |
| 180 | 96.72 | 129.13 | 52.64 |
| 120 | 106.26 | 141.87 | 49.52 |
| 120 | 111.44 | 148.80 | 49.20 |
| 90 | 105.53 | 140.89 | 46.41 |

The data in Table I demonstrate improved results for all cycles utilizing the coarse/fines mixture. The greatest degree of improvement was produced using cycle times between 120 and 180 seconds. The improvement in yield and mass specific product obtained is considered commercially significant.

EXAMPLE 2

In order to demonstrate the effect of various percent combinations of coarse adsorbent particles and fines, a series of runs was carried out utilizing a conventional PSA unit and valving diagram as shown in FIGS. 1 and 2 with 120 and 180 second cycles, respectively. In each run, the relative proportion of fine to coarse particles was varied. The results are given in Table II. The fine particles were impact-grade glass beads having a size range of −50/+70 mesh, average diameter of about 250 microns. The ratio of the smallest dimension of the CMS material to the largest dimension of the beads was about 6:1. Steady state product purity was ninety-nine percent.

TABLE II

| Wt. % Beads | CMS Density g/ml | Spec. Prod. Liter/Hr | Mass Sp. Prd. m³/Tonne/Hr | Yield Percent |
|---|---|---|---|---|
| 120 Second Cycle | | | | |
| 0 | 0.658 | 94.38 | 143.47 | 49.02 |
| 10 | 0.652 | 100.37 | 154.04 | 50.28 |
| 20 | 0.632 | 99.31 | 157.35 | 51.31 |
| 35 | 0.622 | 97.72 | 157.11 | 52.23 |
| 43 | 0.601 | 97.76 | 162.55 | 53.67 |
| 50 | 0.558 | 92.45 | 165.70 | 53.71 |
| 60 | 0.486 | 73.96 | 152.15 | 48.55 |
| 180 Second Cycle | | | | |
| 0 | 0.658 | 84.84 | 128.97 | 53.37 |
| 10 | 0.652 | 87.06 | 133.60 | 54.04 |
| 20 | 0.632 | 86.05 | 136.23 | 55.09 |
| 35 | 0.622 | 84.42 | 136.41 | 56.32 |
| 43 | 0.601 | 86.57 | 149.47 | 58.41 |
| 50 | 0.558 | 78.29 | 140.31 | 56.83 |
| 60 | 0.486 | 65.05 | 133.82 | 53.25 |

The above data shows a more pronounced improvement in yield for the 120 second cycle over the 180 second cycle and improved yield up to a fines concentration of about fifty percent by weight whereas in the 180 second cycle yield decreased above about forty-three percent by weight of fines. A fill of fifty percent by weight of the glass beads utilized in this example is equivalent to about twenty-nine percent by volume. The increases in yield and mass specific product are considered commercially significant.

EXAMPLE 3

A series of experimental runs was conducted utilizing various cycle times and comparing 100% coarse particles, i.e. commercial CMS material (density of 0.664 g/ml), with a mixture of 65% coarse particles 35% impact- grade class beads, −40,+80 mesh (density 0.627 g/ml). The results are given in Table III.

TABLE III

| Cycle Time Seconds | Spec. Prod. Liter/Hr. | Mass Sp. Prod. m³/Tonne/Hr. | Yield Percent |
|---|---|---|---|
| Commercial CMS | | | |
| 90 | 85.96 | 129.46 | 41.86 |
| 120 | 83.41 | 125.62 | 46.30 |
| 180 | 75.25 | 113.33 | 52.08 |
| 360 | 58.31 | 87.82 | 53.53 |
| 480 | 45.76 | 68.92 | 55.45 |
| 60% Commercial CMS/40% Fines (−40, +80 Mesh) | | | |
| 90 | 102.12 | 162.80 | 48.05 |
| 120 | 103.41 | 164.87 | 53.73 |
| 360 | 61.13 | 97.46 | 55.30 |
| 480 | 49.05 | 78.20 | 60.11 |

Although all cycle times utilizing the CMS/inert fines mixture demonstrated improvement, very significant improvement is seen with the shorter cycle times, i.e. 90 to 180 seconds.

We claim:

1. In a system for enrichment of one or more components of a gas mixture by pressure swing adsorption comprising at least one adsorbent bed and means to pass the gas mixture through the bed under pressure, said bed containing coarse particles of carbon molecular sieve, the improvement wherein said bed also contains, as an inert material, glass beads wherein the coarse particles have an average diameter of 1 to 7 mm and the glass beads are between about 40 and 80 mesh, the ratio of the smallest dimension of the coarse particles to the largest dimension of the glass beads is between about 5:1 and 15:1 and the glass beads comprise from about 10 to 50 percent by volume of the bed.

2. A system in accordance with claim 1, wherein said bed contains from about 38 to 42 percent by volume of said glass beads.

3. A system in accordance with claim 1, wherein the carbon molecular sieve pellets have an average diameter of from about 2.5 to 3 mm, said glass beads are between about 40 to 60 mesh and said bed contains about forty percent by volume of said glass beads.

4. A process for enriching a gas stream in a primary product gas comprising introducing said gas stream into a pressure swing adsorption system including at least one adsorbent bed containing coarse particles of carbon molecular sieve and from about 10 to 50 percent by volume of an inert material consisting of glass beads between about 40 and 80 mesh wherein the coarse particles of carbon molecular sieve have an average diameter of 1 to 7 mm and the ratio of the smallest dimension of the coarse particles to the largest dimension of the glass beads is between about 5:1 to 15:1.

5. A process in accordance with claim 4, wherein said bed contains from about 38 to 42 percent by volume of said glass beads.

6. A process in accordance with claim 4, wherein the carbon molecular sieve pellets have an average diameter of from about 2.5 to 3 mm, said glass beads are between about 40 to 60 mesh and said bed contains about forty percent by volume of said glass beads.

* * * * *